Patented Apr. 5, 1949

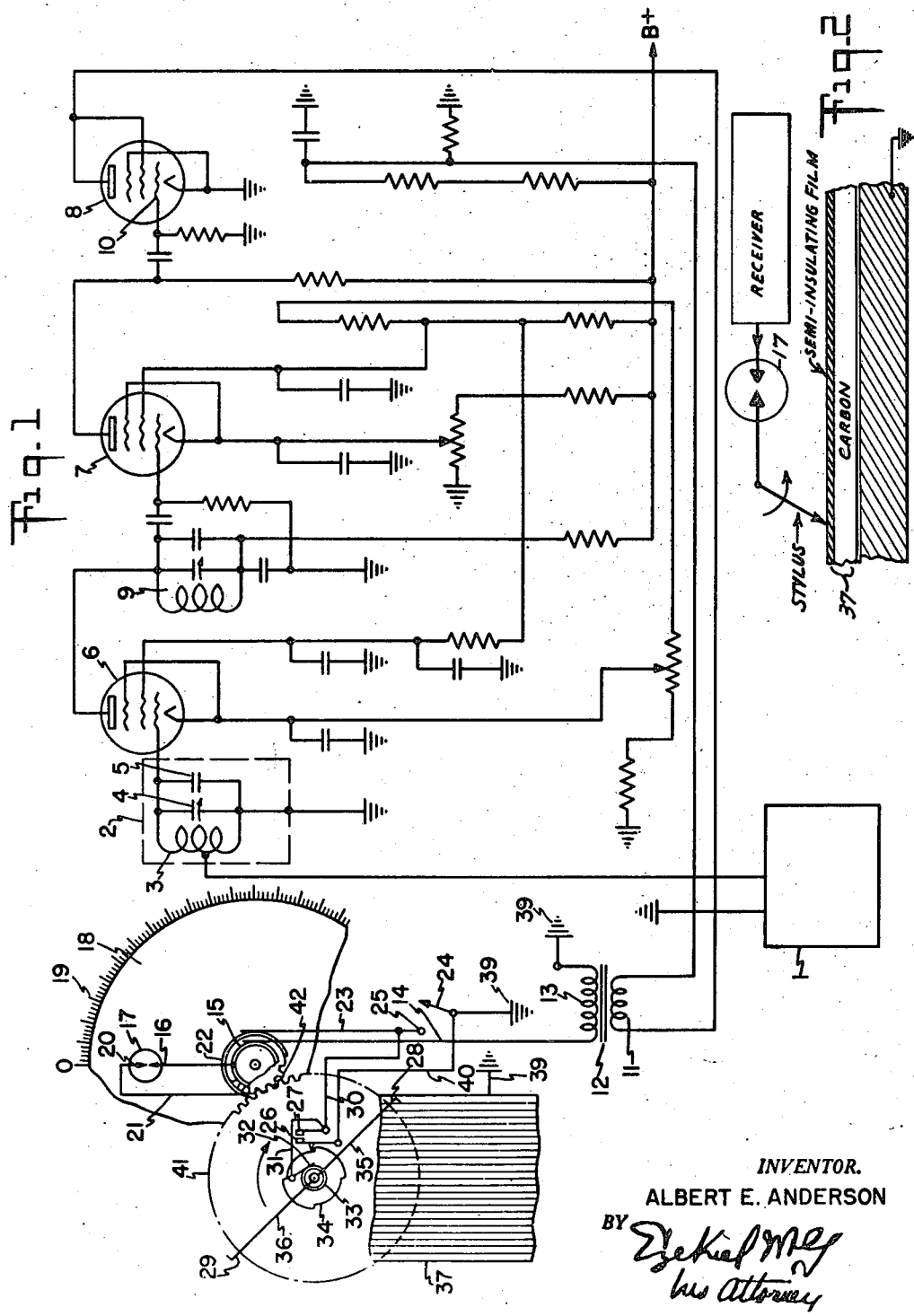
INVENTOR.
ALBERT E. ANDERSON

2,465,990

UNITED STATES PATENT OFFICE 2,465,990

DISTANCE MEASURING DEVICE

Albert E. Anderson, Holbrook, Mass., assignor, by mesne assignments, to Submarine Signal Company, Boston, Mass., a corporation of Delaware Application July 8, 1944, Serial No. 544,107

6 Claims. (Cl. 346—74)

The present invention relates to a depth sounding system or time measuring device in which distance and time intervals may be both visually indicated and permanently recorded. In particular, the present invention is an improvement on depth measuring apparatus employing the time-of-travel method of sound waves sent out from an observing station and received later at the observing station, the time interval measuring the distance from the observing station to the reflecting body which returned the sound wave.

Distance and depth measuring systems by this method have employed permanent recording devices in which a stylus moving across the paper produces a permanent record on the paper of the depth or distances measured.

It is also common to produce a momentary visual indication of the depth by means of a rotating discharge tube, rotating with respect to a scale. Such a system is disclosed in the Dorsey United States Patent No. 1,667,540.

In the present invention these systems are not only combined, but combined in a useful way to produce a simplified system whereby both a visual indication and a permanent record of the distances measured may be obtained. The combination in the present system makes it possible to employ a simplified amplifier output circuit and further gives assurance of the permanent record along with the momentary visual indication which may be observed by the operator. In the present system also the combination provides a very sharp permanent record because of the circuit arrangement in which the discharge tube is in the circuit of the recording stylus. The arrangement also has the feature of eliminating stray signals from the permanent record and providing therefore a cleaner and more readily readable graph of the depths.

These and other advantages will be more readily understood from the description in the specification when taken in connection with the drawing illustrating an embodiment of the invention wherein Fig. 1 shows a diagrammatic circuit arrangement, and Fig. 2 shows an enlarged sectional view of the recording paper and ground connection with diagrammatic circuit connections.

The arrangement in Fig. 1 is more or less diagrammatic showing the circuit arrangement and the elements of the indicating and recording device which enter into the combination of the present invention. In the present system any kind of a sound producer and sound receiver may be employed, the sound signal being sent out in the usual manner when the indicator is at its zero position on the measuring scale. The mechanism for accomplishing this may be of any of the usual well-known types and does not form a feature of the present invention.

In the present system the reflected sound wave may be picked up by the unit 1 indicated in block diagram which is a receiver of sound and which converts the sound into electrical energy in any well-known manner. The impulse so received, which may be a wave train of a limited length, is impressed upon the tuned receiver 2 comprising preferably a coil 3, a tuning condenser 4 and a fixed condenser 5 connected in parallel. The rest of the amplifying circuit including the vacuum tubes 6, 7 and 8 is somewhat similar to the circuit disclosed in the United States Patent No. 2,033,160, the tubes 6, 7 and 8 being electron coupled with the input circuit 9 to the tube 7 being tuned in a manner similar to the tuned circuit just described and the tube 7 normally biased to cut off when no signal is coming in. The pulse picked up by the receiver 1 and passed through the receiver amplifying circuit builds up a bias potential on the grid 10 of the tube 8 such that the normal current flow in the anode-cathode circuit of that tube is rapidly cut off. The anode-cathode circuit of the tube 8 has, it will be noted, in it the primary 11 of the transformer 12, and the action of the signal received is therefore in effect an opening of the primary circuit of the transformer 11 with current flowing through it. This induces a high potential in the secondary 13 which is connected by the line 14 to the conducting ring 15 connected to one terminal 16 of the discharge tube 17 mounted on the rotating disc 18 which is rotated with respect to the scale 19. The other terminal 20 of the discharge tube, which may be of the neon type, is connected by the lead 21 to the slip ring 22 from which electric current is taken off by the brush 23. When the switch 24 is closed to the contact 25, the discharge neon tube 20 alone is in circuit with the secondary 13 of the transformer 12. When, however, this switch is open, as indicated in the drawing, then the circuit to the discharge tube 17 must be closed either through the aid of contacts 26 and 27 or through the recording stylus connections 28 or 29. For this purpose the lead from the brush 23 is connected to the lead 30 which ends at the terminal of the contact 27. A lead 31 connected to this point goes to the brush 32 which connects to the slip ring 33 mounted on the cam 34 which also may carry and support the arms 35 and 36 for the styli 28 and 29, respectively. Current may be conducted in this manner from the brush 23 over the conductor 30, the conductor 31, the brush 32, the slip ring 33, either stylus arm 35 or 36, to the stylus 28 or 29. When one of these styli bears upon the recording paper 37, which is of the conductive type, connection is made between the styli and the ground 39 thereby completing the circuit to the same ground 39 connected to the other end of the secondary 13 of the transformer. If neither of the styli should be resting upon the recording paper, then the cam 34 is of such a construction that the contacts 26 and 27 are brought together, completing the circuit from the brush 23 over the lead 30, the contacts 26 and 27, the lead 40 to the ground 39. The cam bearing the styli 35 and 36 may be geared to the disc 18 carrying the slip rings by a pair of gears 41 and 42 in such a manner that for every one revolution of the cam supporting the styli, the indicator 17 would make four revolutions.

With this arrangement it will be noted that the cam 34 is provided with two raised portions corresponding to ninety degree sectors and oriented in such a manner that when either of the styli is sweeping across the recording paper, the contacts 26 and 27 remain apart. When, however, neither of the styli is bearing upon the paper, the contacts 26 and 27 are brought together and the circuit is completed through the discharge indicator 17. In this way the discharge indicator remains always in circuit and produces indications for every revolution. When either of the styli is moving across the paper, the discharge indicator is in series with it and therefore the recording mark and the flash of the discharge indicator are produced simultaneously.

The paper 37 is of the conductive type (Fig. 2) which has a very light semi-insulating film on the surface so that when a current is passed through the styli into the paper, the insulating film is consumed at the point of contact and shows the base of the paper which is impregnated with black carbon and therefore makes a black mark. To bring this about only a comparatively low potential is necessary to provide sufficient current for making a clear mark. On the other hand, the neon or discharge tube 17 is of such a construction that considerably higher potentials are necessary to bring about the ionization of the tube and discharge of current across it. Therefore, while the potential necessary to produce a mark on the paper is relatively small, the circuit including the secondary 13 of the transformer 12 must be provided with considerable potential to create the necessary ionization of the discharge tube in order to produce a discharge through the stylus. This arrangement sets a limit for signals of minimum strength in such a way that unless a definite echo is received, no indication will be produced upon the recording paper. This arrangement eliminates many stray signals which might be picked up by the receiving circuit and impress a feeble current from the stylus to ground. In the arrangement as shown in the figure the signal must be strong enough to ionize the discharge tube and permit a discharge through it before a signal is recorded on the recording paper.

An additional merit to the present arrangement is that since the signal must be built up to a definite value before the discharge occurs, there is a sharp demarcation at the instant the signal is received and the recording takes place at correspondingly the same part of the signal picked up. This sets a definite threshold value which must be surpassed before the signal is produced on the recording paper so that transient effects, influence of strays, phase of the receiving signal and such similar phenomenon are avoided in producing a more accurate measurement of the time interval.

The arrangement above described also has the advantage of adapting both a low impedance recording system and a high impedance indicating system to a single receiving circuit since both recorder and indicator are operated from the same circuit.

Having now described my invention, I claim:

1. In a distance measuring system by the time-of-travel method, in combination, a receiving circuit, an indicator of the discharge type having a relatively high initial impedance, means mounting the indicator for rotation with reference to a scale, a recording paper and stylus having a relatively low impedance, means for rotating the stylus across the paper during intermittent revolutions of the indicator, means connecting said indicator, the recording paper and the stylus in series with each other, and means shunting the recording paper and stylus out of the series circuit during the intermittent revolutions of the indicator when the stylus does not bear on the paper.

2. In a distance measuring system by the time-of-travel method, in combination, a receiving circuit, an indicator of the discharge type having a relatively high initial impedance, means mounting the indicator for rotation with reference to a scale, a recording paper and stylus having a relatively low impedance, means for rotating the stylus across the paper during intermittent revolutions of the indicator, one revolution of the indicator corresponding to the sweep of the stylus across the paper, means connecting the recording paper and the stylus in series with each other, and means shunting the recording paper and stylus out of the series circuit during the intermittent revolutions of the indicator when the stylus does not bear on the paper.

3. In a distance measuring system by the time-of-travel method, in combination, a receiving circuit, an indicator of the discharge type having a relatively high initial impedance, means mounting the indicator for rotation with reference to a scale, a recording paper and stylus having a relatively low impedance, means for rotating the stylus across the paper during intermittent revolutions of the indicator including means gearing the stylus rotating means to the means for rotating the indicator, a cam carried by the means rotating the stylus, a pair of contacts controlled thereby shunting the recording paper and stylus when the stylus does not bear on the paper and means otherwise connecting said indicator, recording paper and stylus in series with each other.

4. In a distance measuring system by the time-of-travel method, in combination, a receiving circuit, an indicator of the discharge type having a relatively high initial impedance, means mounting the indicator for rotation with reference to a scale, a recording paper and stylus having a relatively low impedance, means for moving the stylus across the paper during intermittent revolutions of the indicator, means connecting said indicator, the recording paper and the stylus in series with each other, and means shunting the recording paper and stylus out of the series circuit during the intermittent revolutions of the indicator when the stylus does not bear on the paper.

5. In a distance measuring system by the time-of-travel method, in combination: a receiving circuit; an indicator of the discharge type having a relatively high initial impedance; a scale; means mounting the indicator and scale for relative motion; a recording paper and stylus having a relatively low impedance; means for moving the stylus across the paper; means connecting said indicator, recording paper and stylus in series with each other; and means for shunting said recording paper and stylus out of the series circuit.

6. In a distance measuring system by the time-of-travel method, in combination: a receiving circuit; an indicator of the discharge type having a relatively high initial impedance; a scale; means mounting the indicator and scale for relative motion, wherein said indicator periodically traverses said scale; a recording paper and stylus having a relatively low impedance; means for moving the stylus across the paper during intermittent traverses of said indicator; means connecting said indicator, recording paper and stylus in series with each other; and means for shunting said recording paper and stylus out of the series circuit during said intermittent traverses when said stylus does not bear on said paper.

ALBERT E. ANDERSON.

REFERENCES CITED

The following references are of record in the file of this patent:

UNITED STATES PATENTS

| Number | Name | Date |
|---|---|---|
| 843,189 | Willis | Feb. 5, 1907 |
| 1,943,746 | Simmons | Jan. 16, 1934 |
| 2,128,395 | Berndt et al. | Aug. 30, 1938 |
| 2,408,458 | Turner, Jr. | Oct. 1, 1946 |

FOREIGN PATENTS

| Number | Country | Date |
|---|---|---|
| 647,297 | Germany | July 1, 1937 |